No. 892,161. PATENTED JUNE 30, 1908.
J. J. JENNINGS.
SHOCK ABSORBER FOR VEHICLES.
APPLICATION FILED MAY 7, 1906.
2 SHEETS—SHEET 1.
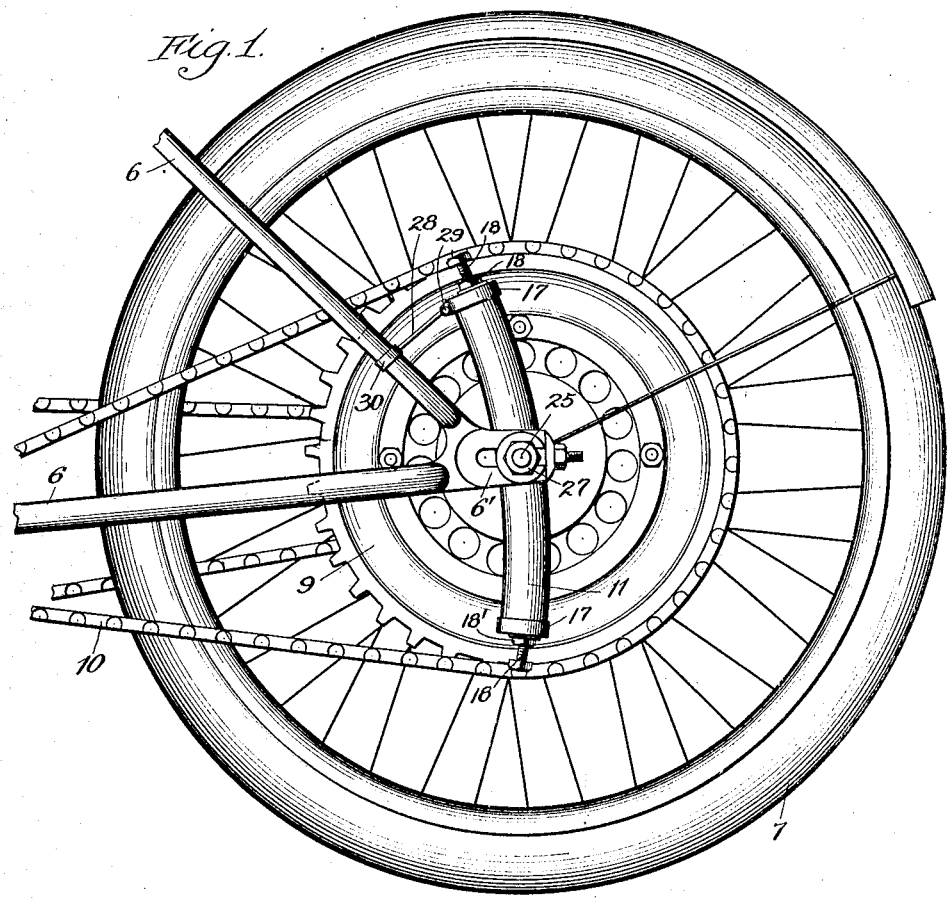
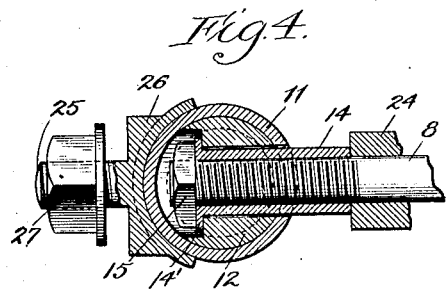
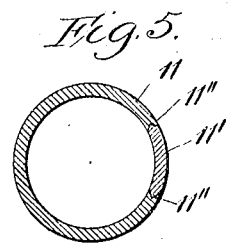

No. 892,161. PATENTED JUNE 30, 1908.
J. J. JENNINGS.
SHOCK ABSORBER FOR VEHICLES.
APPLICATION FILED MAY 7, 1906.

2 SHEETS—SHEET 2.

Witnesses
Harry R. L. White.
M. A. Kiddie

Inventor
Jesse Jerome Jennings
By [signature]
Atty

UNITED STATES PATENT OFFICE.

JESSE JEROME JENNINGS, OF CHICAGO, ILLINOIS.

SHOCK-ABSORBER FOR VEHICLES.

No. 892,161.  Specification of Letters Patent.  Patented June 30, 1908.

Application filed May 7, 1906. Serial No. 315,554.

*To all whom it may concern:*

Be it known that I, JESSE JEROME JENNINGS, a citizen of the United States, residing at Chicago, in the county of Cook and State of Illinois, have invented new and useful Improvements in Shock-Absorbers for Vehicles, of which the following is a specification.

The object of this invention is to provide means which can be readily and easily applied to vehicles for absorbing the shocks and jars incident to travel, and it is particularly useful in connection with bicycles, motor-cycles and automobiles.

Figure 2:
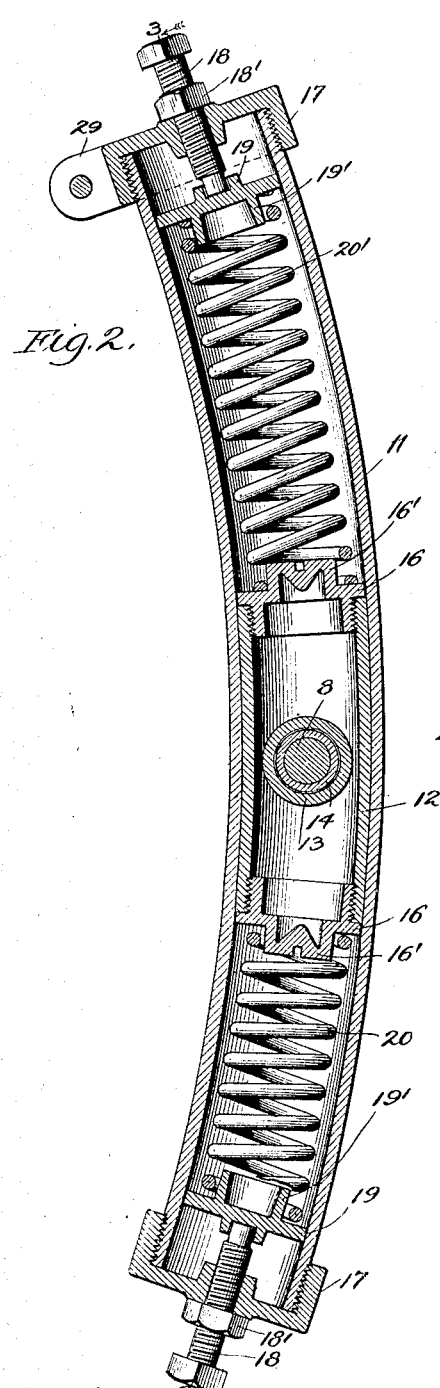
Figure 3:
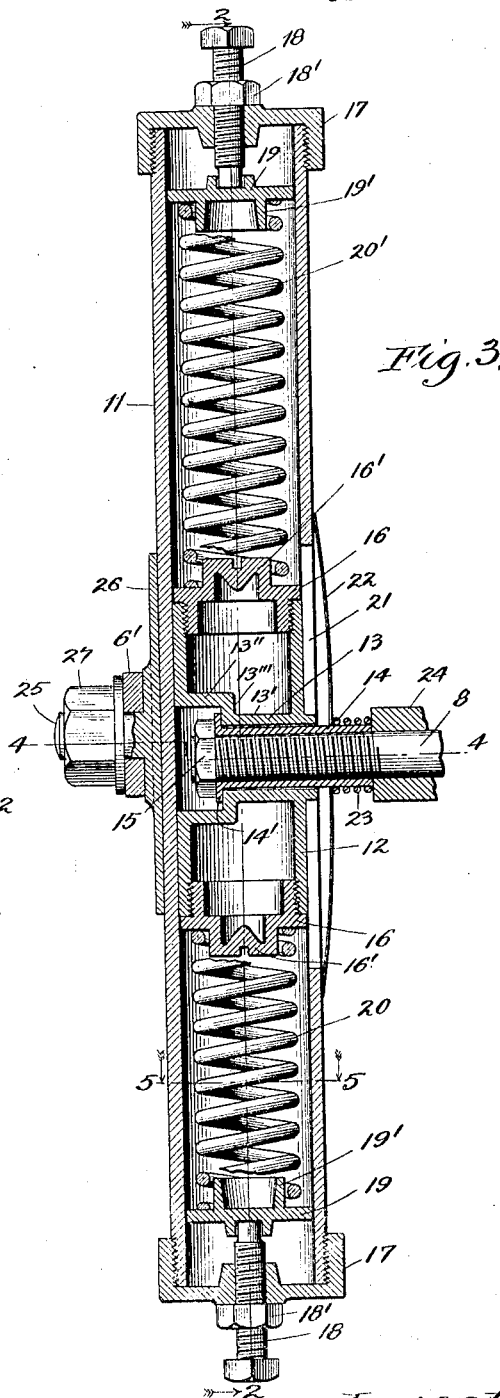

In the accompanying drawings I have shown the invention applied to the rear wheel of a motor-cycle, as one embodiment of the invention, and referring thereto Figure 1 shows the rear wheel and a portion of the frame of a motor-cycle with my invention applied thereto. Fig. 2 is a sectional view on the line 2—2 of Fig. 3. Fig. 3 is a sectional view on the line 3—3 of Fig. 2. Fig. 4 is a sectional view on the line 4—4 of Fig. 3. Fig. 5 is a transverse sectional view of the cylinder on the line 5—5 of Fig. 3.

Referring to the drawings 6 is a motor-cycle frame, 7 the rear wheel, 8 the wheel axle, 9 the sprocket wheel and 10 the driving chain. These parts may be assembled in any usual manner and constitute no part of my present invention.

The shock absorber comprises a cylinder 11 curved in an arc described from the power shaft for driving the chain 10 as a center and arranged to extend above and below the axle 8. One of the cylinders is arranged on each side of the wheel 7, at each end of the axle 8, and both cylinders are constructed and equipped alike. A hollow piston 12 is arranged in the cylinder and curved to correspond with the curvature of the cylinder so that the piston may move easily therein. This piston is provided with a bearing 13 for the axle 8 and one part 13' of this bearing is of smaller diameter than the other part 13'' forming a shoulder 13''' therebetween. The end of the axle 8 is screw-threaded into a sleeve 14 which fits loosely within the part 13' of the bearing 13 and is provided with a flange 14', to engage the shoulder 13'''. A nut 15 on the end of the axle within the part 13'' of the bearing 13 locks the piston on the axle, but should this nut become detached from the axle the flange 14' on the sleeve in engagement with the shoulder 13''' in the bearing will prevent dis-engagement of the piston from the axle.

A cap 16 is screwed into each end of the piston 12 and is provided on its outer side with a projection 16'. A cap 17 is screwed on each end of the cylinder and an adjusting screw 18 is arranged in this cap and bears upon the follower 19 within the cylinder which is provided with a projection 19'. The screw is locked in adjusted position by a nut 18'. Springs 20, 20' are arranged within the cylinder between the caps 16 and followers 19 and are held against displacement by the projections 16' and 19' thereon. The cylinder is provided with an elongated opening 21 to permit the cylinder to move relative to the axle 8 and this opening is covered by a dust guard plate 22 which is held in place by a spring 23 arranged on the sleeve 14 between the plate 22 and the cone 24 of the wheel bearing. The cylinder is provided opposite the opening 21 with a threaded stud 25 carried by a plate 26 which is brazed or otherwise rigidly fastened to the cylinder. The stud 25 is arranged to fit in the slotted plate 6' carried by the frame 6 and the cylinder is securely locked to the frame by a nut 27. The cylinder is provided with a dove-tailed section 11' which can be removed to permit the piston and axle to be arranged in the cylinder, and the edges of this section and the adjacent edges of the cylinder are dove-tailed at 11'' (Fig. 5).

In assembling the parts of this device the piston, the plate 22 and the spring 23 are arranged on the sleeve 14 and then the sleeve is screwed into place on the axle 8 and the nut 15 is screwed on the axle to hold the parts in place. The section 11' of the cylinder and the cap at the bottom of the cylinder are removed and the upper follower 19, the spring 20', the piston, the spring 20 and the lower follower 19 are then arranged in the cylinder after which the section 11' and the lower cap 17 are replaced. The wheel with the cylinders attached thereto is then secured in the frame by inserting the studs 25 in the slotted plate 6' and screwing on tightly the nuts 27. I may also employ a brace 28 pivotally connected to a lug 29 at the upper end of the cylinder and fastened in any suitable manner to a collar 30 on the frame 6. The piston is held on the axle 8 and the cylinder is held on the frame so that the cylinder and the piston are capable of relative movement and this movement is controlled by the tension of the springs. When the rider mounts the motor-cycle his weight will cause the frame and cylinder to move downward relative to the axle thereby compressing the spring 20' and whenever the wheel strikes an obstruction it will tend to move upward relative to the frame thereby further compressing the spring 20'. Thus the spring 20' may be considered the principal compression spring and the spring 20 is a recoil spring.

The cylinder is curved on the arc of a circle described from the driving shaft for the chain so that in the operation of the device the chain will be constantly maintained properly stretched. The sleeve 14 has a slight play in the bearing to provide for the angularity of movement of the piston relative to the axle.

What I claim and desire to secure by Letters Patent is:

1. A shock absorber comprising a pair of cylinders, means for securing said cylinders rigidly and between their ends on the frame of a vehicle, a piston within each cylinder, an axle on the vehicle having its ends secured in said pistons to revolve therein, compression springs within the cylinders above the pistons, and recoil springs within the cylinders below the pistons.

2. A shock absorber comprising a pair of cylinders, means for securing said cylinders rigidly and between their ends on the frame of a vehicle, there being an elongated opening in each cylinder on the inner side thereof, a piston within each cylinder, a bearing within each piston, an axle on the vehicle journaled in said bearings and having its ends secured to said pistons, compression springs within the cylinders above the pistons, and recoil springs within the cylinders below the pistons.

3. A shock absorber comprising a cylinder adapted to be connected to one part of a vehicle, a piston within the cylinder adapted to be connected to another part of the vehicle, springs within the cylinder at opposite ends of the piston whereby to absorb the shock due to the relative movement of said parts of the vehicle, followers within the cylinder near the ends thereof to engage the ends of the springs, and screw bolts operating through the ends of the cylinder to adjust said followers.

4. The combination with the frame and a wheel axle of a vehicle, of a cylinder rigidly connected to the frame and provided with an opening in one side thereof, a piston within the cylinder, a bearing in said piston to receive said axle which extends into said bearing through the opening in the cylinder, means for fastening the piston on the axle, a spring pressed dust guard over the opening in the cylinder, and springs within the cylinder between the ends of the piston and the ends of the cylinder.

5. The combination of the frame and a wheel axle of a vehicle, of a cylinder rigidly mounted on the frame, a piston within the cylinder, a bearing within the piston, a shoulder on said bearing, a sleeve within the bearing and screw threaded on the axle, a flange on the end of the sleeve arranged to engage said shoulder, a nut on the end of the axle to bear against said sleeve, and yielding means between the ends of the piston and the ends of the cylinder.

6. The combination of the frame and a wheel axle of a vehicle, a cylinder mounted on the frame, a piston, means for securing the piston on said axle, said cylinder having a removable section to permit the piston to be inserted into the cylinder after it has been connected to the axle, and yielding means between the ends of the piston and the ends of the cylinder.

7. The combination of a vehicle frame, a wheel, a sprocket on said wheel, a chain for driving said sprocket, and means for absorbing the shock due to relative movement of said frame and wheel, said means comprising a continuous cylinder curved on an arc described from the driving shaft of said chain as a center, means for rigidly mounting said cylinder on said frame, a piston within the cylinder, and curved to correspond thereto, means for connecting said piston rigidly to the axle of said wheel, and springs within the cylinder between the ends of the piston and the ends of said cylinder.

JESSE JEROME JENNINGS.

Witnesses:
WM. O. BELT,
M. A. KIDDIE.